United States Patent
Martin et al.

(10) Patent No.: US 6,917,784 B2
(45) Date of Patent: *Jul. 12, 2005

(54) IMAGE FORMATION BY PASSIVE COLLECTION AND PROCESSING OF RADIO FREQUENCY SIGNALS ILLUMINATING AND SCATTERED BY CULTURAL FEATURES OF TERRESTRIAL REGION

(75) Inventors: Gayle Patrick Martin, Merritt Island, FL (US); John W. Shipley, Sebastian, FL (US)

(73) Assignee: Harris Corporation, Melbourne, FL (US)

( * ) Notice: Subject to any disclaimer, the term of this patent is extended or adjusted under 35 U.S.C. 154(b) by 27 days.

This patent is subject to a terminal disclaimer.

(21) Appl. No.: 10/664,193

(22) Filed: Sep. 17, 2003

(65) Prior Publication Data

US 2004/0058643 A1 Mar. 25, 2004

Related U.S. Application Data

(63) Continuation of application No. 09/713,637, filed on Nov. 15, 2000, now abandoned.

(51) Int. Cl.$^7$ ................................................ H04H 1/00
(52) U.S. Cl. ................ 455/3.02; 455/12.1; 455/426.1; 455/427; 342/25; 342/173; 342/174; 342/191; 342/192
(58) Field of Search .............................. 455/3.02, 422.1, 455/63.1, 12.1, 13.1, 427, 426.1, 423–425, 226.1; 342/25 A, 25 F, 172–178, 191–192

(56) References Cited

U.S. PATENT DOCUMENTS

| | | | | | |
|---|---|---|---|---|---|
| 5,659,318 | A | * | 8/1997 | Madsen et al. | 342/25 R |
| 5,767,802 | A | * | 6/1998 | Kosowsky et al. | 342/45 |
| 5,805,098 | A | * | 9/1998 | McCorkle | 342/25 R |
| 5,940,737 | A | * | 8/1999 | Eastman | 725/68 |
| 6,232,922 | B1 | * | 5/2001 | McIntosh | 342/453 |
| 6,384,766 | B1 | * | 5/2002 | Ulander | 342/25 R |
| 6,400,306 | B1 | * | 6/2002 | Nohara et al. | 342/25 R |
| 6,424,290 | B1 | * | 7/2002 | O'Neil et al. | 342/55 |
| 6,466,156 | B1 | * | 10/2002 | Ulander | 342/25 R |
| 6,518,914 | B1 | * | 2/2003 | Peterson et al. | 342/25 R |
| 6,700,527 | B1 | * | 3/2004 | Martin et al. | 342/25 R |

* cited by examiner

*Primary Examiner*—William Trost
*Assistant Examiner*—Brandon J. Miller
(74) *Attorney, Agent, or Firm*—Allen, Dyer, Doppelt, Milbrath & Gilchrist, P.A.

(57) ABSTRACT

An imaging system uses 'RF daylight' created by an RF illumination source, such as a television broadcast tower, to passively generate RF scattering coefficients for multiple points within a prescribed three-dimensional volume being illuminated by the RF transmitter. The scattering coefficients provide a complex interference pattern having amplitude and phase components that contain all information necessary to recreate a three-dimensional monochromatic image of the illuminated scene. Coherent complex correlation provides scene information content that is only a function of scene scattering and collector geometry. The scene information may be coupled to an image utility subsystem, such as a virtual reality simulator, for generation of a three-dimensional image of the illuminated scene.

16 Claims, 3 Drawing Sheets

IMAGE FORMATION BY PASSIVE COLLECTION AND PROCESSING OF RADIO FREQUENCY SIGNALS ILLUMINATING AND SCATTERED BY CULTURAL FEATURES OF TERRESTRIAL REGION

CROSS-REFERENCE TO RELATED APPLICATION

This application is a continuation of U.S. application Ser. No. 09/713,637, filed Nov. 15, 2000, entitled: "Image Formation by Passive Collection and Processing of Radio Frequency Signals Illuminating and Scattered by Cultural Features of Terrestrial Region", by P. Martin et al., now abandoned, assigned to the assignee of the present application, and the disclosure of which is herein incorporated.

The present invention was developed under a contract with the United States Government.

FIELD OF THE INVENTION

The present invention relates in general to electromagnetic energy collection and processing systems, and is particularly directed to a method and apparatus for generating an image of a terrestrial region of interest, by passively collecting and processing radio waves, such as, but not limited to, those illuminating the terrestrial region from a commonly available RF emission source, for example, a commercial television transmission tower.

BACKGROUND OF THE INVENTION

Conventional schemes for generating images of objects or scenes include a variety of energy illuminating and collection methodologies, such as visible and infrared light-based processes (e.g., photography), and coherent electromagnetic radiation-based processes (e.g., synthetic aperture radar (SAR) and holography). While conventional (non-coherent) light-based photography allows image capture of exterior surfaces of objects in a scene, it does not create an image of where the light cannot go (behind the exterior surface of an object, such as into the interior of a building or beneath a vegetation canopy, in the case of visible light).

Synthetic aperture radar and holography use coherent electromagnetic radiation (e.g., narrow bandwidth radar pulses in the case of SAR and coherent light in the case of holography) to construct an image. Advantageously, because it processes volume-based (rather than planar-based) differential phase information, holography is able to provide for the generation of a three-dimensional image of an object. Still, its use to date has been essentially limited to controlled, volume-constrained static environments, such as an optophysics laboratory.

There are many terrestrial regions, such as cities, industrial areas, and the like, containing a wide variety of cultural features, such as buildings, bridges, towers, etc., as well as interior components thereof, for which images (including those captured at different times for determining the presence of environmental changes) are desired by a variety of information analysis enterprises. Curiously, many if not most of such terrestrial regions are continuously illuminated by a relatively powerful narrowband radio frequency (RF) transmitter, such as television broadcast towers, creating a condition known as 'RF daylight'. Because of the partial transparency to such RF emissions (especially at and below VHF and UHF frequencies) of many objects, including both natural vegetation and man-made structures, these RF-daylight signals can be expected to be reflected/scattered off cultural features (including both exterior and interior surfaces) of an illuminated region.

SUMMARY OF THE INVENTION

In accordance with the present invention, advantage is taken of this 'RF daylight' phenomenon, to passively acquire RF reflectance or scattering coefficient parameter values of multiple points within a prescribed three-dimensional volume being illuminated by an RF transmitter. As will be described, the passive image generation system of the invention collects and processes RF energy that may be reflected-scattered from multiple points of a three-dimensional space within a region being illuminated by a coherent RF energy source, such as a television transmitter.

Pursuant to a non-limiting embodiment, the system of the invention employs a front end, RF energy collection section that contains a reference signal collector (antenna) which collects non-scattered RF energy emitted by an RF reference source illuminating the potentially cultural feature-containing terrestrial region of interest. A second, dynamic scattered image energy collector mounted on a platform, overflying the illuminated terrestrial region collects RF energy that has been scattered-reflected from various points of cultural features (such as buildings and contents thereof) within a three-dimensional volume of space containing the terrestrial region.

The reference signal collector and the scattered image energy collectors may comprise airborne or spaceborne RF energy collection platforms. Alternatively, reference signal collection and scattered energy collection may involve the use of a common RF energy collector, or respectively separate energy collectors located on the same platform. Also, the image energy collector may be located on an airborne or spaceborne platform and the reference signal collector may comprise a ground-based receiver. The scattered RF image energy collection platforms containing the scattered energy collector(s) are dynamic in plural non-coincident travel paths, to ensure that energy collected from the terrestrial region of interest will be derived by way of multiple offset views of that region, which provides the resulting aperiodic lattice additional power to resolve image ambiguities and enhance the three-dimensional imaging capability of the invention. Once captured by their respective energy receiver sections, the RF reference signal energy and the RF image energy are digitized and stored, so that they may be readily coupled to an image processing section.

The scattered image data processing section assumes that the source of RF energy illuminating the three-dimensional spatial volume of interest is located at some fixed location in space, known a priori. A respective location of a scattered RF energy collector moving along a respective travel path above and past the terrestrial region is defined by a set of collection aperture coordinates. Where the scattered RF energy collector is used to simultaneously collect non-scattered energy emitted from the reference signal source, termed a 'self-referential' embodiment, the received signal y(t) produced by the RF energy collector contains the direct path signal from the illumination source to the collector plus time-delayed, Lorentz-transformed RF energy that may be scattered or reflected from the illuminated location and incident upon the collection aperture.

Because the coordinates of the source of the reference signal are spatially displaced from the location of a respective illuminated point, there will be a time delay associated with the reference signal's travel path from the source to the potential scattering location, and also and a time delay associated with the reference signal's travel time from the reference signal source to the RF energy collection aperture. In addition, there is a time delay associated with the travel time of the RF energy scattered from the illuminated location to the scattered image energy collector.

To properly correlate the reference signal emanating from the illuminating source with the RF energy signal received by the moving collector, it is necessary to account for these delays, as well as the time-scaling of the signal received by the energy collector resulting from the fact its platform is moving relative to the illuminated potentially scattering location. To this end, the signal received at the dynamic collector is applied to a first Lorentz transform operator that accounts for signal propagation delay and performs a Lorentz transform of the signal from its moving frame of reference at the collection aperture location to the static frame of reference of the illuminated point in space. The output of this first Lorentz transform operator is then applied to a delay which imparts a delay associated with the reference signal's propagation time from the source to the illuminated location. The combined effect of this first Lorentz transform and delay operation serves to transform the reference signal component of the energy received at the collection aperture to the illuminated location. The transformed signal is coupled as a first input-of a correlation multiplier.

The received signal is further applied to a second Lorentz transform operator which accounts for signal propagation delay and performs a second Lorentz transform of the received signal from its moving frame of reference to the static frame of reference of the illuminated point in space. Because the 'self referential' embodiment of the invention provides for the collection of the scattered energy and reference illumination signals by a common energy collector, the received signal at the dynamic collection aperture also contains the reference illumination signal. In order remove this reference signal component from the desired scattered image component, the output of the second Lorentz transform operator is coupled to a reference signal suppression operator, that serves to significantly null out the reference signal component. The resultant reference-nulled signal represents the scattered component of the receive signal as transformed to the illuminated location and is coupled as a second input of the correlation multiplier.

Where the scattered energy signal and the reference signal are collected by separate energy collectors, the signal received by the scattered energy collection aperture will not contain a potentially dominant reference signal component that requires removal, as described above. In this instance, the received signal is applied only to a single Lorentz transform operator the output of which is coupled to the correlation multiplier. Moreover, where a copy of the reference signal is available, no Lorentz transform of the illuminating reference signal is necessary; instead, the reference signal need only be compensated for the signal propagation time delay and coupled to the correlation multiplier.

The correlation multiplier multiplies the reference signal transform component by the scattered signal transform component to produce a product that is integrated over a relatively long integration interval, such as one on the order of several tens of seconds to several tens of minutes, and sufficient to ensure that only scattered energy values associated with RF frequency from the reference source illuminating the scattered location will constructively combine, whereas all others will destructively cancel. This produces a scattering coefficient for the illuminated location that is representative of reference signal energy from the transmission reference signal source as scattered by that location.

The scattering coefficient information is a complex interference pattern (containing both amplitude and phase components) containing all the information necessary to recreate a three-dimensional monochromatic image of the illuminated scene. Namely, the coherent complex correlation provides scene information content that is only a function of scene scattering and collector geometry. Assuming that the scene does not change substantially over the collection period, the synthetic aperture amplitude and phase distribution may be collected and extracted sequentially rather than simultaneously.

The output of the correlation integrator may be coupled to a downstream image utility subsystem, such as a virtual reality simulator, multi-image slice display device, and the like, for generation of the three-dimensional image of the scene, and facilitate stereoscopic viewing of the image. The resolution to which the illuminated scene may be imaged (three-dimensionally) is limited by the Rayleigh wavelength (i.e., one-half the wavelength) of the illuminating reference source.

DETAILED DESCRIPTION

Figure 1:
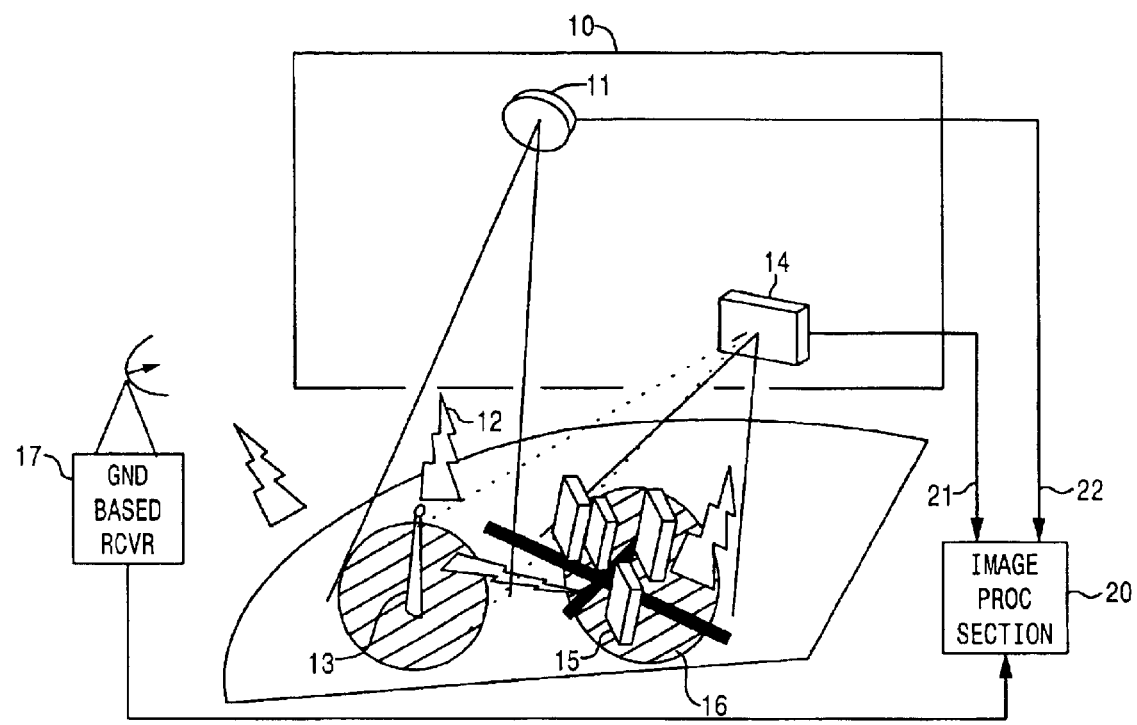
FIG. 1 diagrammatically illustrates an embodiment of a passive image generation system of the invention.

Before describing in detail the new and improved passive image generation scheme of the present invention, it should be observed that the scattered RF collection and processing system of the invention resides primarily in a prescribed arrangement of conventional radio wave collection subsystems and components, and associated digital processing equipment that processes digital data representative of scattered RF energy received by the radio wave collection subsystems, in order to derive pixel/voxel data representative of cultural features of a region illuminated by the RF energy illuminating a particular scene of interest.

Consequently, the configuration of the image generation system of the invention has, for the most part, been illustrated in the drawings by readily understandable block diagrams, which show only those specific details that are pertinent to the present invention, so as not to obscure the disclosure with details which will be readily apparent to those skilled in the art having the benefit of the description herein. Namely, the diagrammatic illustrations to be described are primarily intended to show the major components of the invention in a convenient functional grouping, whereby the present invention may be more readily understood.

As pointed out briefly above, the passive image generation system of the present invention is operative to collect and process RF energy that may be reflected—scattered from multiple points of some prescribed portion of a three-dimensional space being illuminated by an RF energy source, such as a commercial television transmitter, as a non-limiting example, that is typically situated in proximity to a terrestrial region that can be expected to contain cultural features (e.g., buildings and contents thereof) of which an image is desired. For this purpose, as diagrammatically illustrated in FIG. 1, the image generation system of the invention includes a front end, RF energy collection section 10, and a downstream RF energy processing section 20.

In the system diagram of FIG. 1, the RF energy collection section 10 is shown as containing a first, reference signal collector 11, that is operative to collect non-scattered RF energy 12 emitted by an RF source 13, such as a commercial television broadcast tower, that illuminates the potentially cultural feature-containing terrestrial region of interest. The RF energy collection section also includes a second, scattered image energy collector 14, that is operative to collect RF energy that has been scattered—reflected from various points of cultural features (such as buildings and contents thereof) 15 within a three-dimensional volume of space 16 containing the terrestrial region of interest being illuminated by the source 13.

As non-limiting examples, each of the reference signal collector 11 and the scattered image energy collector 14 may comprise respective (airborne or spaceborne) RF energy collection platforms, containing their own antenna and receiver subsystems. In an alternative configuration, both the reference signal collector and the scattered or image energy collector may involve the use of a common RF energy collector, or respectively separate energy collectors located on the same platform. As a further variation, the image energy collector 14 may be located on an airborne or spaceborne platform and the reference signal collector may comprise a ground-based receiver, as shown at 17.

Figure 2:
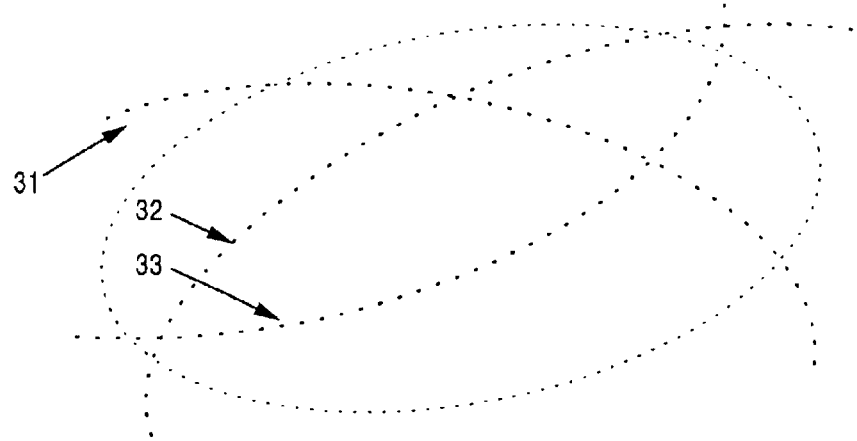
FIG. 2 diagrammatically illustrates a scattered RF image energy collector coupled with a platform overflying an illuminated region by way of a plurality of respectively different, non-parallel 'fly-by', paths.

Regardless of the energy collection arrangement employed, the one or more scattered RF image energy collection platforms containing the scattered energy collector(s) are dynamic in plural non-coincident travel paths, to ensure that energy collected from the terrestrial region of interest will be derived by way of multiple offset views of that region. That is, as shown in FIG. 2, the scattered RF image energy collector 14 (which may include more than one image energy collector) is coupled with a platform one which overflies the illuminated region 16 by way of a plurality of respectively different, non-parallel 'fly-by' paths (three of which are shown at 31, 32 and 33, as non-limiting examples), so as to provide for the gathering of three-dimensionally scattered RF energy from cultural features in the illuminated region.

Namely, the synthetic aperture realized by the collector geometry is three-dimensional, since the travel path of the collector over the illuminated region of interest effectively follows a curved path and is not likely to be at exactly the same altitude on each pass. This provides the resulting aperiodic lattice additional power to resolve image ambiguities and enhances the three-dimensional imaging capability of the invention.

It may also be noted that the gathering of scattered energy may be carried out by multiple RF energy collection platforms traveling simultaneously or sequentially along different paths, or by a single platform sequentially traveling (and potentially repeatedly) along different paths. Once captured by their respective energy receiver sections, the RF reference signal energy and the RF image energy are digitized and stored, so that they may be readily coupled to the image processing section 20.

As non-limiting examples, the coupling the stored RF energy captured and stored on board the dynamic airborne or spaceborne platform to the image processing station may be accomplished directly by providing the image processing section 20 on the same platform as the energy collector, such as on board an aircraft or spacecraft; it may also be accomplished by landing the platform and transferring the stored data to a terrestrially located image processing section; and it may be communication channel-downlinked (as shown by broken links 21 and 22 in FIG. 2) to the image processing station.

Figure 3:
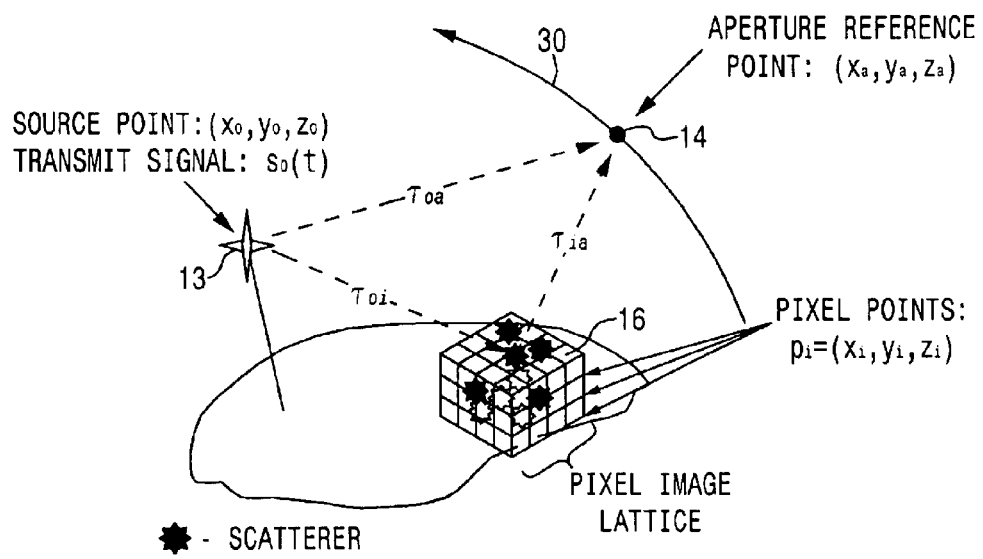
FIG. 3 diagrammatically illustrates the overall mechanism carried out by the image processing section of FIG. 1.

FIG. 3 diagrammatically illustrates the overall mechanism that is carried out by the image processing section for processing RF energy data that has been collected by the front end section, so as to obtain a set of (spatially orthogonal scattering coefficient values) for the case of an arbitrary, illuminated location (pixel point $p_i$), defined by a respective set of (three-dimensional) Cartesian coordinates ($x_i$, $y_i$, $z_i$) within the volume of space 16 of the terrestrial region illuminated by the reference source 13. In terms of the diagrammatic illustration of FIG. 1, described above, the source 13 of RF energy illuminating the three-dimensional spatial volume of region 16 is denoted as a reference signal source $s_o(t)$, which is assumed to be located at some fixed location in space, having coordinates ($x_o$, $y_o$, $z_o$), known a priori.

A respective location of a scattered RF energy collector 14 (as it moves along a respective travel path 30 above and past the terrestrial region 16) is defined by a set of collection aperture (a) coordinates ($x_a$, $y_a$, $z_a$), which may be readily provided by precision navigation instrumentation, such as a GPS-based position location subsystem. In the embodiment illustrated by the spatial diagram of FIG. 3, the scattered RF energy collector 14 is also used to simultaneously collect non-scattered energy emitted from the reference signal source $s_o(t)$, so as to provide what is termed as a 'self-referential' approach. Namely, a received signal y(t) produced by the RF energy collector 14 contains the direct path signal $s_o(t)$ from the source 13 to the collector 14, as well as time-delayed, Lorentz-transformed RF energy that may be scattered or reflected from the illuminated location $p_i$, and incident upon the collection aperture (a) of the collector 14.

Advantages of this self-referential embodiment include the ability to use a single energy collection location to acquire all required waveforms, the elimination of errors, such as time transfer, local oscillator offset, processing signals that have propagated through different media, and open loop differential time delay, as well as the use of less complex processing (differential Lorentz transform) and the elimination of the requirement for an absolute illumination signal reference. A disadvantage is the increase in cross-correlation noise, which requires the use of an illumination source signal suppression operator, as will be described.

The signal Y(t) may be represented in equation (1) as:

$$y(t) = (g_{oa}/r_{oa}) * s_o(\gamma_{oa}[t - (r_{oa}/c)] + \sum_i (g_{oia}\sigma_i^{1/2}/r_{oi}r_{ia})s_o(\gamma_{ia}[t - (r_{oi} + r_{ia})/c]) \quad (1)$$

where the first term corresponds to the direct path signal from the source $s_o(t)$, and the second, summation term corresponds to the scattered signal from the illuminated location $p_i$. The components of equation (1) may be defined as follows:

c=the speed of light;

t=time as measured in the moving collection aperture (a) frame of the collector 14;

$g_{oa}$=the gain power factor for the path from the source 13 to the aperture of the moving collector 14;

$g_{oia}$=gain power factor for the path from the source 13 to the ith scatterer at illuminated location $p_i$ to the collection aperture of the collector 14;

$r_{oa}$=the distance from the source 13 to the collection aperture of the collector 14;

$r_{oi}$=the distance from the source 13 to the ith scatterer;

$r_{ia}$=the distance from the ith scatterer at illuminated location $p_i$ to the collection aperture of the collector 14;

$\gamma_{oa}$=Lorentz time scaling for the path from the source 13 to the collection aperture of the collector 14;

$\gamma_{ia}$=Lorentz time scaling for the path from the potential scatterer location $p_i$ to the collection aperture of the collector 14; and $\sigma_i$=the scattering coefficient for the ith scatterer at illuminated location $p_i$.

The Lorentz time scaling $\gamma_{oa}$ may be defined as:

$$\gamma_{oa} = (1 - r_{oa}/c)/(1 - (r_{oa}/c)^2)^{1/2} \quad (2).$$

The Lorentz time scaling $\gamma_{ia}$ may be defined as:

$$\gamma_{ia} = (1 - r_{ia}/c)/(1 - (r_{ia}/c)^2)^{1/2} \quad (3)$$

The gain power factor $g_{oa}$ may be expressed as:

$$|g_{oa}|^2 \cdot \lambda^2 G_t(\hat{a}_{oa}) G_r(\hat{a}_{oa})/16n^2, \quad (4)$$

and the gain power factor $g_{oia}$ may be expressed as:

$$|g_{oia}|^2 = \lambda^2 G_t(\hat{a}_{oi}) G_r(\hat{a}_{ia})/64n^3, \quad (5)$$

where $G_t$, $G_r$ are respective gains of the transmitting antenna of the illuminating source 13 and the receiver antenna(s) of the collector 14, the values â are path unit vectors, and λ is the wavelength of the RF signal transmitted by the illuminating source 13.

It should be noted that, due to the differential processing mechanism of the invention, the coordinates $(x_0, y_0, z_0)$ used to specify the location of the reference signal source $s_o(t)$ need not specify the exact location of the transmitter 13. As long as the coordinates $(x_o, y_o, z_o)$ are reasonably proximate to the actual location of the reference signal source $s_o(t)$, the processed result for the illuminated location $p_i$ (and all others) will be spatially shifted from the image produced if the coordinates of the source 13 were known with precision; as a consequence, the generated scene will simply be a spatially shifted image, containing the same resolvable cultural details that would be obtained were the exact location of the phase center of the transmitter's emitted RF signal known a priori.

Because the coordinates $(x_0, y_0, z_0)$ of the source of the reference signal $s_o(t)$ are spatially displaced from he location $(x_i, y_i, z_i)$ of the illuminated point $p_i$ of interest, there will be a time delay shown by broken lines $\tau_{oi}$ associated with the reference signal's travel path from the source $s_o(t)$ to the potential scattering location $p_i$, and a time delay shown by broken lines $\tau_{oa}$ associated with the reference signal's travel time from the reference signal source $s_o(t)$ to the RF energy collection aperture at coordinates $(x_a, y_a, z_a)$. In addition, broken lines $\tau_{ia}$ represent the time delay associated with the travel time of the RF energy scattered from the illuminated location $p_i$ to the received image signal coordinates $(x_a, y_a, z_a)$ of the scattered image energy collector 14.

In order to properly correlate the reference source signal $s_o(t)$ emanating from the source 13 with the RF energy signal y(t) received by the moving collector 14, it is necessary to account for these delays, as well as the time-scaling of the signal received by the energy collector 14 resulting from the fact its platform is moving relative to the illuminated location $p_i$. These adjustments are shown in the correlation signal processing diagram of FIG. 4.

In particular, the received signal y(t) as collected by the collector 14 at the RF energy collection aperture coordinates $(x_a, y_a, z_a)$ is applied to a first processing path that includes a first Lorentz transform operator 41. This first Lorentz transform operator accounts for the delay $\tau_{oa}$ and performs the first Lorentz transform $\gamma_{oa}$ of the signal y(t) from its moving frame of reference at collection aperture location $(x_a, y_a, z_a)$ to the static frame of reference of illuminated location $p_i$.

The output of the first Lorentz transform operator 41 is then applied to a delay 43, which imparts a delay $\tau_{oi}$ associated with the reference signal's travel time from the source $s_o(t)$ to the illuminated location $p_i$. The combined effect of this first Lorentz transform and delay operation serves to transform the reference signal component of the-energy received by the collector 14 to the location $p_i$. The output of delay 43 is coupled as a first input 42 of a correlation multiplier 44.

The received signal y(t) is further applied to a second processing path that includes a second Lorentz transform operator 45, which accounts for the delay $\tau_{ia}$ and performs a second Lorentz transform $\gamma_{ia}$ of the received signal y(t) from its moving frame of reference at location $(x_a, y_a, z_a)$ to the static frame of reference of location $p_i$. Because the 'self referential' system of FIG. 3 provides for the collection of both the scattered energy and reference illumination signals by means of a common energy collector 14, the received signal y(t) also contains the reference illumination signal $s_o(t)$ (which can be expected to be a substantial or dominant portion of the received signal).

Figure 5:
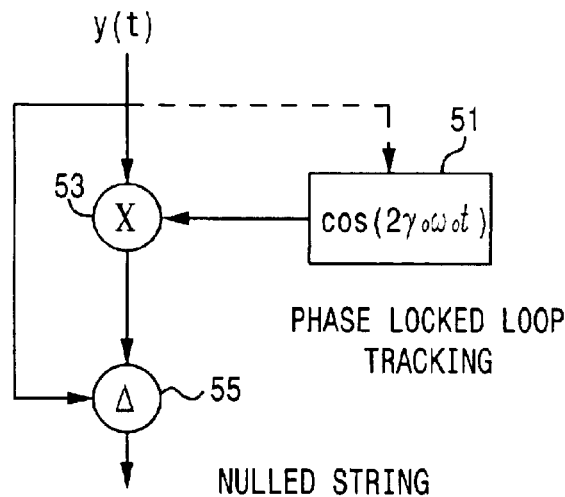
FIG. 5 shows an example of a reference signal suppression operator.

In order remove this reference signal component $s_o(t)$ from the desired scattered image component of the received signal y(t), the output of the second Lorentz transform $\gamma_{ia}$ operator 45 is coupled to a reference signal suppression or 'correlation discriminant' operator 47, that serves to significantly null out (e.g., reduce on the order of 30–60 dB or more) the amplitude of the reference signal component. As a non-limiting example, the reference signal suppression operator 47 may comprise a spectral inversion-based nulling mechanism of the type diagrammatically illustrated in FIG. 5.

Figure 6:
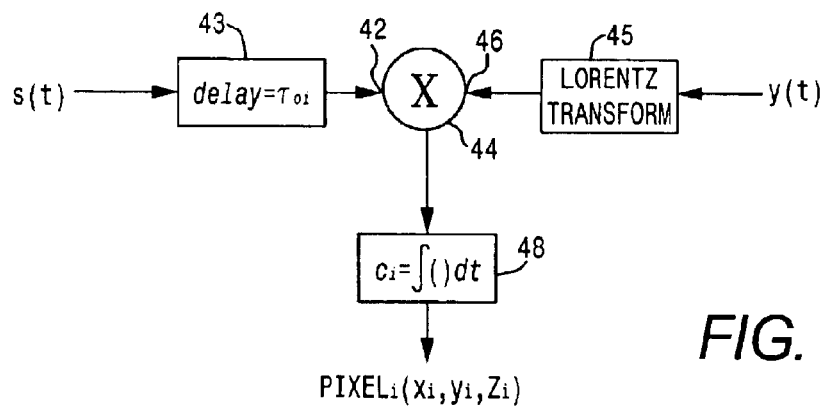
FIG. 6 shows a reduced complexity correlation signal processing diagram.

As shown therein, the received signal y(t) is coupled as an input to a phase locked loop tracking operator 51, which produces an output representative of $\cos(2\gamma_o \Omega_o t)$. This frequency shifted signal is then multiplied in a multiplier 53 by the signal y(t), to produce a spectral inversion of the received signal, that places the desired information signal (containing the scattered information) at a sideband of the illuminating reference. This spectrally inverted version of the received signal is then differentially combined with the received signal y(t) in differential combiner 55, which excises or nulls out the spectrally coincident reference component in the two multiplied signals, leaving only the desired scattered energy component. The resultant reference-nulled signal output by the reference signal suppression operator 47, which represents the scattered component of the receive signal y(t) as transformed to the illuminated location $p_i$, is coupled as a second input 46 of the correlation multiplier 44.

Where the scattered energy signal and the reference signal are collected by separate energy collectors, the signal y(t) provided by the energy collector 14 will not contain a potentially dominant reference signal component that requires removal, as described above. In this instance, as shown in FIG. 6, the signal y(t) is applied only to the Lorentz transform operator 45, the output of which is coupled to the second input 46 of multiplier 44. Also, where a copy of the reference signal $s_o(t)$ at illumination source location ($x_o$, $y_o$, $z_o$) is available, no Lorentz transform of the illuminating reference signal is necessary; instead, the reference signal need only be coupled through a delay 43 to compensate for the travel time delay $\tau_{oi}$, with the output of delay 43 being coupled to the first input 42 of the multiplier 44 as described above.

Figure 4:
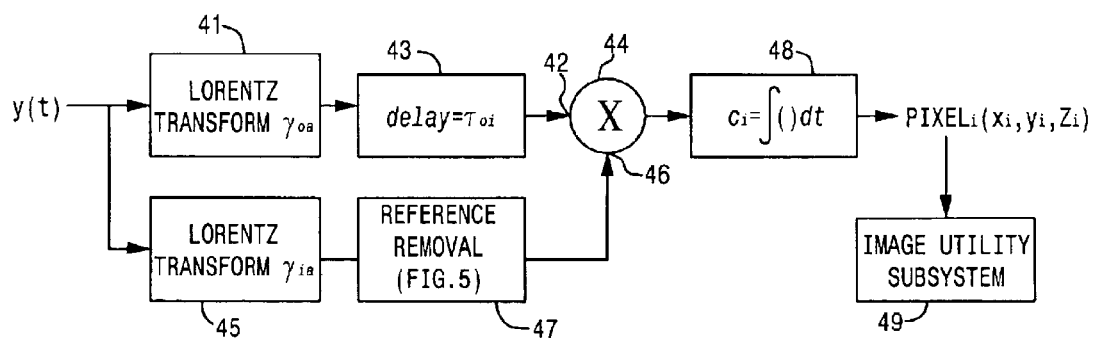
FIG. 4 is a correlation signal processing diagram associated with the operation of the RF energy processing section of FIG. 1.

As shown in FIGS. 4 and 6, the multiplier 44 multiplies the reference signal transform $\gamma_{oa}$ based component at its input 42 by the scattered signal transform $\gamma_{ia}$ based component at its input 46, so as to produce a product that is summed or integrated by a correlation integrator 48. The integration period of integrator 48 is of a relatively long duration (which may be on the order of several tens of seconds to several tens of minutes, as a non-limiting example), that is sufficient to ensure that only scattered energy values associated with RF frequency from the source $s_o(t)$ illuminating the location $p_i$ will constructively combine, whereas all others will destructively cancel, leaving as a valid scattering coefficient information $c_i$ for illuminated location $p_i$ only that derived from reference signal energy emanating from the transmission reference signal source 13.

The scattering coefficient information obtained from the above described correlation processing is a complex interference pattern (containing both amplitude and phase components) containing all the information necessary to recreate a three-dimensional monochromatic image of the illuminated scene. Namely, the coherent complex correlation provides scene information content that is only a function of scene scattering and collector geometry. Assuming that the scene does not change substantially over the collection period (which may involve multiple passes of the image collecting platform(s)), it does not matter that the synthetic aperture amplitude and phase distribution is collected and extracted sequentially rather than simultaneously).

The output of the integrator 48 may be coupled to a downstream image utility subsystem 49, such as but not limited to a virtual reality simulator, multi-image slice display device, and the like, for generation of the three-dimensional image of the scene, and facilitate stereoscopic viewing of the image at any perspective (within scene illumination and collection limits).

The resolution to which the illuminated scene may be imaged is limited by the Rayleigh wavelength (i.e., one-half the wavelength) of the illuminating reference source $s_o(t)$. As a non-limiting example, for an illuminating frequency on the order of 50 MHz, the image feature resolution may be on the order of ten feet, while for an illuminating frequency on the order of 500 MHz, the image feature resolution may be on the order of one foot.

Figure 7:
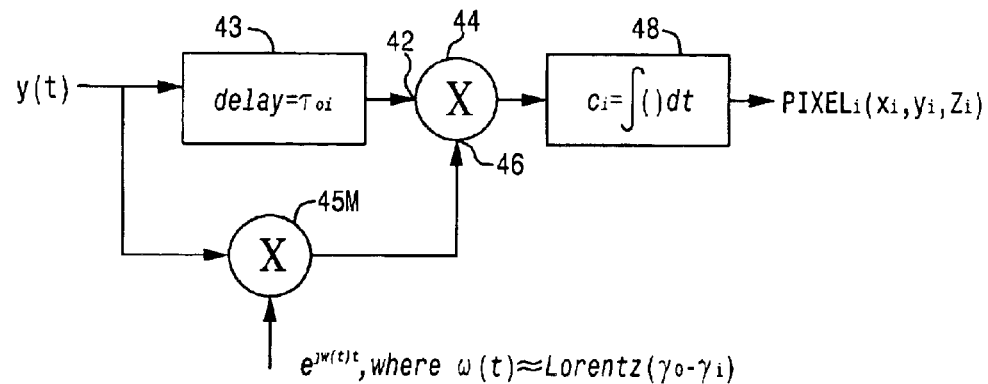
FIG. 7 shows a reduced complexity implementation of the correlation signal processing diagram of FIG. 4, where the differential Lorentz transform operators are replaced by a Doppler shift mechanism.

FIG. 7 shows a reduced complexity implementation of the correlation signal processing diagram of FIG. 4, where the differential Lorentz transform operators are replaced by a Doppler shift mechanism. In this case the Lorentz transform operator 41 is removed and the Lorentz transform operator 45 is replaced by a multiplier 45M, to which the signal y(t) and the signal $e^{j\omega(t)}$ are applied, where $\omega(t)=\text{Lorentz}(\gamma_{oa},-\gamma_{ia})$ With respect to sensitivity of the image collection subsystem, it may be noted that the collection bandwidth should be sufficient to encompass the RF illumination source (making maximum use of its power); however, the ultimate bandwidth of the synthetic aperture (hologram) formation process is objectively zero. The correlation operation obtains a Doppler spread of the scene's cultural features as seen by the collector, and is usually much smaller the transmitted signal's bandwidth. As a non-limiting example, the Doppler spread might typically be tens of kHz at UHF, so that nearly 30 dB sensitivity improvement is immediately realized upon correlation when a television transmitter is employed as the illuminating signal source. From a functional standpoint (assuming that other system-level factors do not limit integration time), the total observation time will establish a lower bandwidth, which may be on the order of milli- or even micro-Hz. As a result, processing gain on the order of 90 dB or greater may be achieved, allowing the imaging of relatively weakly illuminated scene features, using practical implementation G/T collector components.

It may also be noted that the correlation process described above allows indefinite reduction of co-channel interference and noise biases, as such waveforms are not coherent with the transmitted signal. In addition, correlation quality improves directly with the number of samples, due to the presence of a high signal to noise plus interference reference signal, even though scattered signals received from scene features may be well below the ambient noise plus co-channel interference level. A practical implication involves imaging scene illumination points that are relatively close to the reference source relatively quickly—using a relatively low G/T collector, while scene elements at the edge of the observed region may require the coherent summation of many passes of the collector.

Because the potential collecting volume of the synthetic aperture is quite immense (e.g., tens or hundreds of miles in effective diameter), even relatively dimly illuminated regions of the scene having high co-channel interference can be imaged. The rate at which the synthetic aperture can be filled with scattered image data is proportional to the collector's G/T, which implies a trade-off between collector G/T versus the time required to form a given quality image.

As will be appreciated from the foregoing description, the passive imaging system of the present invention takes advantage of RF daylight created by commonplace RF illumination sources, such as a television broadcast tower, to passively acquire RF scattering coefficients for multiple points within a prescribed three-dimensional volume being illuminated by the RF transmitter. The scattering coefficients provide a complex interference pattern having amplitude and phase components and containing all the information necessary to recreate a three-dimensional monochromatic image of the illuminated scene. Thus, the coherent complex correlation provides scene information content that is only a function of scene scattering and collector geometry. The scene information may be coupled to an image utility subsystem, such as a virtual reality simulator, multi-image slice display device, and the like, for generation of the three-dimensional image of the scene, and facilitate stereoscopic viewing of the image.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. A method of generating an image of a terrestrial region upon which electromagnetic energy from an electromagnetic energy source is incident, said method comprising the steps of:
   (a) passively collecting non-scattered electromagnetic energy emitted by said electromagnetic energy source by way of at least one first passive electromagnetic energy collector that is exclusive of any electromagnetic energy emission element employed by said electromagnetic energy source to emit said electromagnetic energy;
   (b) passively collecting, by at least one second passive electromagnetic energy collector moving arbitrarily and independently of said electromagnetic energy source among a plurality of distributed energy collection locations, electromagnetic energy emitted by said electromagnetic energy source and scattered by features of said terrestrial region of interest, said at least one second passive electromagnetic energy collector being exclusive of any electromagnetic energy transmission element employed by said electromagnetic energy source;
   (c) processing a reference signal representative of electromagnetic energy collected in step (a), in accordance with information representative of the collection geometry of said at least one first passive energy collector and the geolocation of said electromagnetic energy source, so as to derive a time- and location-corrected reference signal;
   (d) correlating the time- and location-corrected reference signal derived in step (c) with an image signal representative of electromagnetic energy collected by said at least one moving second passive energy collector in step (b), so as to derive composite amplitude and phase values of scattering components for plural locations of said terrestrial region as received by said at least one moving second passive energy collector as a function of spatial position; and
   e) processing said composite scattering components derived in step (d) to produce said multidimensional image of said terrestrial region of interest.

2. A method according to claim 1, wherein said electromagnetic energy source comprises a television signal transmitter tower, and step (b) comprises passively collecting electromagnetic energy emitted by said television signal transmitter tower, and scattered by features of said terrestrial region of interest, by means of an airborne or spaceborne electromagnetic energy collection platform moving among said plurality of distributed energy collection locations.

3. A system for deriving image information representative of cultural features of a terrestrial region illuminated by an RF transmitter comprising:
   a passive reference signal collection subsystem which is operative to passively collect non-scattered RF energy emitted by said RF transmitter illuminating said terrestrial region, and which is exclusive of any component of said RF transmitter used to emit said RF energy;
   a passive dynamic scattered image energy subsystem which is exclusive of any component of said RF transmitter and is operative to travel past said terrestrial region along a path that is arbitrary and independent of said RF transmitter, and passively collect from plural non-coincident viewing paths of said terrestrial region, RF energy scattered from points of cultural features within a three-dimensional volume of space containing said terrestrial region; and
   a collected signal processing subsystem, which is operative to process information representative of said non-scattered RF energy as collected by said reference signal collection subsystem, to derive a coherent reference signal corresponding to that transmitted by said RF transmitter illuminating said terrestrial region, time- and location-corrected as necessary to points within said three-dimensional volume of space, and to correlate said coherent reference signal with a scattered RF energy signal representative of electromagnetic energy collected by said dynamic scattered image energy subsystem, time- and location-corrected as necessary to said points within said three-dimensional volume of space, so as to derive composite amplitude and phase values of scattering components for said points of said three-dimensional space.

4. A system according to claim 3, further including an image generator subsystem, which is operative to process said composite amplitude and phase values of scattering components for said points of said three-dimensional space to produce a multidimensional image of cultural features of said terrestrial region.

5. A system according to claim 3, wherein said passive reference signal collection subsystem and said passive dynamic scattered image energy subsystem are configured to employ a common passive RF energy collector that simultaneously and passively collects said non-scattered RF energy emitted by said RF transmitter illuminating said terrestrial region, and RF energy scattered from points of cultural features within said three-dimensional volume of space containing said terrestrial region.

6. A system according to claim 3, wherein said passive reference signal collection subsystem and said passive dynamic scattered image energy subsystem employ respectively separate passive RF energy collectors that simultaneously passively collect said non-scattered RF energy emitted by said RF transmitter illuminating said terrestrial region, and RF energy scattered from points of cultural features within said three-dimensional volume of space containing said terrestrial region.

7. A system according to claim 5, wherein said collected signal processing subsystem includes:
   a coherent reference signal processing section having a first Lorentz transform operator that accounts for signal propagation delay from said transmitter to said passive reference signal collection subsystem, and performs a Lorentz transform of an RF energy signal received thereby to a static frame of reference of a respective point in said three-dimensional space, and a delay associated with said reference signal's propagation time from said transmitter to said respective point, so as to effectively transform a reference signal component of RF energy received at the collection aperture of said passive reference signal collection subsystem to said respective point, and a dynamic scattered signal processing section having a second Lorentz transform operator which accounts for signal propagation delay and performs a second Lorentz transform of RF energy received by said passive dynamic scattered image energy subsystem from its moving frame of reference to the static frame of reference of said respective point in said three-dimensional space.

8. A system according to claim 7, wherein said passive dynamic scattered signal processing section includes a reference signal suppression operator coupled to remove a reference signal component from the scattered image component of RF energy received by said passive dynamic scattered image energy subsystem.

9. A system according to claim 8, wherein said collected signal processing subsystem includes a correlator, which is operative to correlate the output of said dynamic scattered signal processing section with the output of said coherent reference signal processing section, to derive composite amplitude and phase values of scattering components for said points of said three-dimensional space.

10. A system according to claim 9, further including an image generator subsystem, which is operative to process said composite amplitude and phase values of scattering components for said points of said three-dimensional space to produce a multidimensional image of cultural features of said terrestrial region.

11. A method for passively deriving image information representative of cultural features of a region illuminated by an RF transmitter comprising:

(a) providing a coherent reference signal representative of RF energy emitted by said RF transmitter illuminating said terrestrial region;

(b) passively collecting, from a dynamic passive energy collector, that is exclusive of any electromagnetic energy emission element employed by said RF transmitter and traverses a plurality of mutually offset travel paths offset from said terrestrial region that are arbitrary and independent of said RF transmitter, RF energy scattered, as a result of illumination by RF energy emitted by said RF transmitter, from points that are capable of defining cultural features within a three-dimensional volume of space containing said terrestrial region; and c) correlating said coherent reference signal, time- and location-corrected as necessary to said points within said three-dimensional volume of space, with a scattered RF energy signal representative of electromagnetic energy collected by said dynamic passive energy collector, time- and location-corrected as necessary to said points within said three-dimensional volume of space, so as to derive composite amplitude and phase values of scattering components for said points of said three-dimensional space.

12. A method according to claim 11, further including the step (d) of processing said composite amplitude and phase values of scattering components for said points of said three-dimensional space to produce a multidimensional image of cultural features of said terrestrial region.

13. A method according to claim 11, wherein steps (a) and (b) include employing a common passive RF energy collector to simultaneously collect non-scattered RF energy emitted by said RF transmitter illuminating said terrestrial region, and RF energy scattered from said points of cultural features within said three-dimensional volume of space containing said terrestrial region.

14. A method according to claim 11, wherein steps (a) and (b) include employing respectively separate passive RF energy collectors to collect RF energy emitted by said RF transmitter illuminating said terrestrial region, and RF energy scattered from said points of cultural features within said three-dimensional volume of space containing said terrestrial region.

15. A method according to claim 13, wherein step (c) comprises:

(c1) processing said coherent reference signal in accordance with a first Lorentz transform that accounts for signal propagation delay from said transmitter to a passive collector for said reference signal and performs a Lorentz transform of an RF energy signal received thereby to a static frame of reference of a respective point in said three-dimensional space, and providing a delay associated with said reference signal's propagation time from said transmitter to said respective point, so as to effectively transform a reference signal component of RF energy received by said passive collector to said respective point, and (c2) processing said scattered RF energy signal in accordance with a second Lorentz transform operator which accounts for signal propagation delay and performs a second Lorentz transform of RF energy received by a passive collector for said scattered RF energy signal from its moving frame of reference to the static frame of reference of said respective point in said three-dimensional space.

16. A method according to claim 15, wherein step (c2) includes processing said scattered RF energy signal in accordance with a reference signal suppression operator that is operative to remove a reference signal component from said scattered RF energy signal.

* * * * *

UNITED STATES PATENT AND TRADEMARK OFFICE
CERTIFICATE OF CORRECTION

PATENT NO. : 6,917,784 B2
APPLICATION NO. : 10/664193
DATED : July 12, 2005
INVENTOR(S) : Martin et al.

It is certified that error appears in the above-identified patent and that said Letters Patent is hereby corrected as shown below:

| | |
|---|---|
| Column 3, Line 2 | Delete: "also and a"<br>Insert: -- also a -- |
| Column 3, Line 39 | Delete: "order remove"<br>Insert: -- order to remove -- |
| Column 6, Line 11 | Delete: "coupling the:"<br>Insert: -- coupling of the -- |
| Column 7, Line 37 | Delete: "$Y_{oa} = (1 - r_{oa}/c)/(1 - (r_{oa}/c)^2)^{2/2}$ (2)."<br>Insert: -- $Y_{oa} = (1 - r_{oa}/c)/(1 - (r_{oa}/c)^2)^{1/2}$ (2) -- |
| Column 7, Line 45 | Delete: "$\|g_{oa}\|^2, \lambda^2 G_t(\hat{a}_{oa})G_r(\hat{a}_{oa})/16n^2$, (4)"<br>Insert: -- $\|g_{oa}\|^2 = \lambda^2 G_t(\hat{a}_{oa})G_r(\hat{a}_{oa})/16\pi^2$, (4) -- |
| Column 7, Line 50 | Delete: "$\|g_{oia}\|^2 = \lambda^2 G_t(\hat{a}_{oi})G_r(\hat{a}_{ia})/64n^3$, (5)"<br>Insert: -- $\|g_{oia}\|^2 = \lambda^2 G_t(\hat{a}_{oi})G_r(\hat{a}_{ia})/64\pi^3$, (5) -- |
| Column 7, Line 57 | Delete: "$(x_0, y_0, z_0)$"<br>Insert: -- $(x_o, y_o, z_o)$ -- |
| Column 8, Line 5 | Delete: "$(x_0, y_0, z_0)$"<br>Insert: -- $(x_o, y_o, z_o)$ -- |
| Column 8, Line 55 | Delete: "order remove"<br>Insert: -- order to remove -- |
| Column 9, Line 1 | Delete: "$\cos(2\gamma_o \Omega_o t)$"<br>Insert: -- $\cos(2\gamma_o \omega_o t)$ -- |
| Column 9, Line 60 | Delete: "simultaneously)."<br>Insert: -- simultaneously. -- |

UNITED STATES PATENT AND TRADEMARK OFFICE
CERTIFICATE OF CORRECTION

PATENT NO. : 6,917,784 B2
APPLICATION NO. : 10/664193
DATED : July 12, 2005
INVENTOR(S) : Martin et al.

It is certified that error appears in the above-identified patent and that said Letters Patent is hereby corrected as shown below:

Column 10, Line 24   Delete: "smaller the"
                     Insert: -- smaller than the --

Signed and Sealed this

Twenty-seventh Day of February, 2007

JON W. DUDAS
*Director of the United States Patent and Trademark Office*